E. FILIPEK.
STUD.
APPLICATION FILED FEB. 26, 1913.
1,073,032.
Patented Sept. 9, 1913.
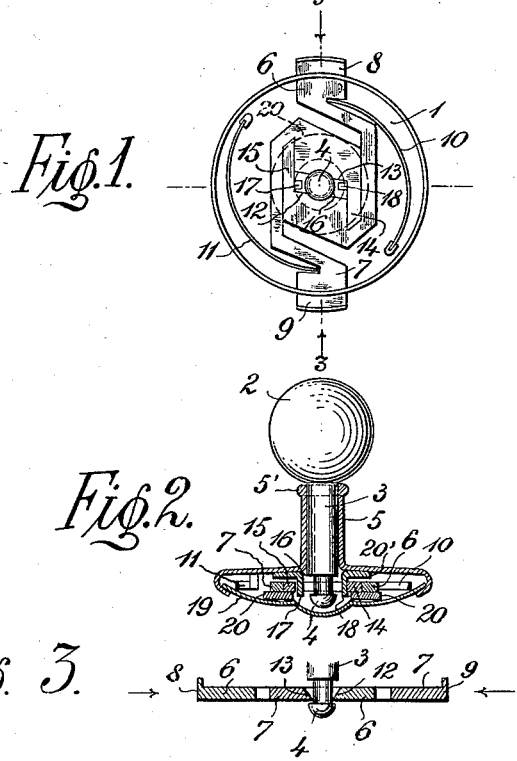
Witnesses:
J. W. Michael, Jr.
M. E. Shook
Inventor:
Eugen Filipek
By Edson Bros.
Attorneys

UNITED STATES PATENT OFFICE.

EUGEN FILIPEK, OF PFORZHEIM, GERMANY.

STUD.

1,073,032.  Specification of Letters Patent.  Patented Sept. 9, 1913.

Application filed February 26, 1913. Serial No. 750,866.

*To all whom it may concern:*

Be it known that I, EUGEN FILIPEK, a subject of the Emperor of Austria-Hungary, residing at Pforzheim, Germany, have invented certain new and useful Improvements in Studs; and I do hereby declare the following to be a full, clear, and exact description of the invention, such as will enable others skilled in the art to which it appertains to make and use the same.

My invention relates to studs of that class in which a pin carrying the head of the stud is held in position in the base of the stud by a pair of symmetrically movable spring actuated clamping slides. According to my invention these clamping slides are guided in each other positively and in a straight line by means of legs; moreover on both sides of the hole receiving the head pin projections are provided serving for more accurately guiding the clamping slides and for limiting their movements.

In the annexed drawing Figure 1 is a bottom view of a stud embodying my invention, the bottom plate of the base being removed. Fig. 2 is a vertical section of the stud and Fig. 3 shows a detail.

1 is the base and 2 is the head of the stud carried by a pin 3 having preferably a thickened lower end 4 or a circumferential groove just above its lower end. The base is preferably provided with a sleeve 5 having a projecting rim or flange 5' at its upper end. The clamping device mounted within the base consists of two clamping slides 6, 7 substantially U shaped and located in one plane, one leg of each of them engaging between the two legs of the other. One of the legs of each of the clamping slides projects radially from the base as shown at 8 and 9 respectively, while the other leg 14 and 15 respectively of each of the clamping slides carries a clamping edge 12 and 13 respectively. These clamping edges are opposite each other and at substantially right angles to the legs 14, 15 of the clamping slides carrying them.

10 and 11 are springs mounted in the base and tending to force the clamping slides toward each other so that the clamping edges 12, 13 engage with the thickened end of the pin 3 or with its circumferential groove. By pressing inward the ends 8, 9 of the clamping slides the clamping edges are separated and disengaged from the pin 3. When moving toward each other the clamping slides are positively and exactly guided by their legs engaging with each other. For securely guiding the legs 14, 15 of the clamping slides when the latter are moving the one away from the other guide pins 17, 18 may be provided in the base, on each side of the opening 16 into which the pin 3 is inserted, these guide pins 17, 18 engage with the inner sides of the legs 15 and 14 respectively and are preferably formed integral with the washer 20'. These guide pins 17, 18 serve also as stops for limiting the outward movement of the clamping slides and clamping edges under the action of the springs 10 and 11 so that the clamping edges are normally (that is to say when the clamping slides are entirely left to the action of the springs 10, 11) at some distance from each other and that on inserting the pin 3 the clamping edges are readily moved apart by the thickened end 4 of the pin 3 passing between them. The clamping edges are then moved toward each other by the springs 10 and 11 engaging with the pin above its thickened end 4 or into the circumferential groove on the lower end of this pin thereby securely holding the latter in position.

For holding the clamping slides in one plane suitable washers 20 and 20' guiding the said slides on their top and bottom sides are provided in the base of the button; central holes in these washers permit the pin 3 to pass through. The sleeve 5 guides the pin 3 on inserting the same into the base and the projecting rim or flange 5' of the sleeve prevents the sleeve from slipping out of the button hole before or during the insertion of the stud head. The head 2 is secured to the base by simply inserting the pin 3 into the openings 16 whereby as above explained the clamping edges are first forced apart whereupon the springs 10, 11' move them toward each other causing them to engage with and securely hold the pin in the base. For taking out the stud the clamping slides are forced apart by pressing inward their leg ends 8 and 9 when the pin 3 may be drawn out from between the clamping edges.

What I claim then is:

In a stud, the combination of a head, a pin carrying such head, a base having an opening in its upper side adapted to receive the lower end of the said pin, a pair of U shaped clamping slides mounted in the base, one leg of each of such slides entering between the two legs of the other clamping slide and the other leg of each clamping slide projecting radially from the base, guide pins secured in the base on opposite sides of the said opening and on the inner sides of the first named legs of the clamping slides, means for guiding such clamping slides in one plane in the base and springs mounted in the base and engaging with the said clamping slides whereby the latter are moved toward each other.

In testimony whereof, I affix my signature, in presence of two witnesses.

EUGEN FILIPEK.

Witnesses:
JOSEPH PFEIFFER,
ERNST KUHNHE.

Copies of this patent may be obtained for five cents each, by addressing the "Commissioner of Patents, Washington, D. C."